No. 817,844. PATENTED APR. 17, 1906.
C. R. GILBERT.
SALT SHAKER.
APPLICATION FILED OCT. 14, 1905.

Witnesses
Inventor
Charles R. Gilbert
by Hazard & Harpham,
Attorneys

UNITED STATES PATENT OFFICE.

CHARLES R. GILBERT, OF LOS ANGELES, CALIFORNIA.

SALT-SHAKER.

No. 817,844.  Specification of Letters Patent.  Patented April 17, 1906.

Application filed October 14, 1905. Serial No. 282,845.

*To all whom it may concern:*

Be it known that I, CHARLES R. GILBERT, a citizen of the United States, residing at Los Angeles, in the county of Los Angeles and State of California, have invented new and useful Improvements in Salt-Shakers, of which the following is a specification.

The object of my invention is to provide a shaker for use in a salt-cellar which is simple, cheaply constructed, easily inserted in the cellar, and which will not only agitate the salt therein, but will prevent the salt from adhering to the top, bottom, or sides of the cellar. I accomplish this object by means of the device described herein and shown in the accompanying drawings, in which—

Figure 1:
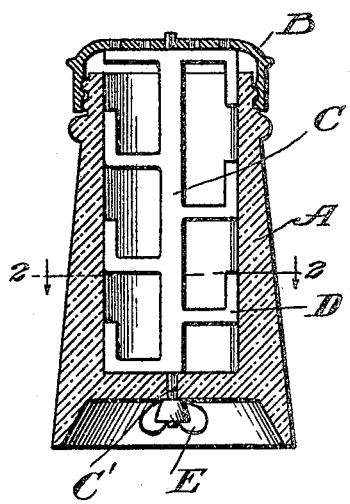
Figure 2:
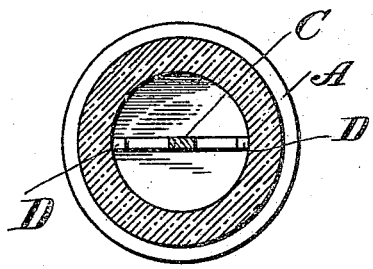

Figure 1 is a central vertical section of a salt-cellar with my improved shaker therein, the shaker being shown in elevation. Fig. 2 is a transverse section of a cellar with my improved shaker therein, taken on the line 2 2 of Fig. 2 looking downwardly as indicated by the arrow-heads thereon.

In the drawings, A is the body of the cellar, and B is the top thereof. Rotatably mounted in the body of the cellar is the shaker C, provided with outwardly-extending scraper-arms D. The main stem of the shaker is provided with a plurality of outwardly-projecting scraper-arms having upwardly-projecting scraper ends, as shown. These scraper-arms are disposed along on either side of the stem equidistant apart, the arms on one side being so arranged that the scraper-arms on the opposite side project outwardly from a point on the stem midway between arms on the other side of the stem, and thereby provide means whereby the entire inner walls of the cellar are scraped, the scrapers on one side scraping one-half of the inner wall of the cellar and the scrapers on the other side scraping the balance of the wall, the arms of the top and bottom scrapers serving to scrape the top and bottom of the cellar, respectively. A thumb-nut E is tightly screwed upon a screw-threaded projection C' on the main stem, by means of which the shaker is rotated in the cellar. In all salt-shakers of which I am aware no provision has been made to scrape the entire inside of the cellar. By mounting these scraper-arms alternately on either side of the main stem of the shaker provision is made to scrape all of the inside of the cellar as well as agitate the salt in the cellar.

Having described my invention, what I claim as new, and desire to secure by Letters Patent, is—

A shaker for a salt-cellar adapted to scrape the entire inner surface of the cellar, comprising a central longitudinal stem rotatively mounted in the cellar and having an end projecting outwardly therethrough—the stem having on opposite sides thereof scraper-arms, the said scraper-arms being mounted at points on the stem equidistant from the points where the arms on the opposite side are mounted, the said scraper-arms being provided with upturned scraper portions in length at least one-half the distance between the scraper-arms, the upper arm having a scraping fit with the top wall of the cellar and the lower arm having a scraping fit with the lower wall of the cellar.

In witness that I claim the foregoing I have hereunto subscribed my name this 6th day of October, 1905.

CHARLES R. GILBERT.

Witnesses:
 GEO. L. ASHTON,
 JOHN ALLEN.